(12) United States Patent
Gstoettenmayr et al.

(10) Patent No.: US 9,802,838 B2
(45) Date of Patent: Oct. 31, 2017

(54) METHOD AND APPARATUS FOR TREATING PROCESS WATER

(75) Inventors: Alois Gstoettenmayr, Rainbach (AT); Hado Heckmann, Linz (AT); Kurt Lukschander, Schwertberg (AT); Robert Millner, Loosdorf (AT); Ulrike Schmidt, Leonding (AT); Helmut Siegl, Linz (AT); Johann Wurm, Bad Zell (AT); Chong Won Choi, Gyeongsangbuk-do (KR); Seok Min Yoon, Gyeongsangbuk-do (KR)

(73) Assignees: POSCO (KR); PRIMETALS TECHNOLOGIES AUSTRIA GMBH (AT)

( * ) Notice: Subject to any disclaimer, the term of this patent is extended or adjusted under 35 U.S.C. 154(b) by 300 days.

(21) Appl. No.: 13/996,025

(22) PCT Filed: Dec. 6, 2011

(86) PCT No.: PCT/EP2011/071851
§ 371 (c)(1),
(2), (4) Date: Jun. 20, 2013

(87) PCT Pub. No.: WO2012/084480
PCT Pub. Date: Jun. 28, 2012

(65) Prior Publication Data
US 2013/0284019 A1    Oct. 31, 2013

(30) Foreign Application Priority Data
Dec. 20, 2010   (AT) ................ A 2094/2010

(51) Int. Cl.
*B01D 21/00*   (2006.01)
*C02F 1/20*    (2006.01)
*C02F 103/18*  (2006.01)

(52) U.S. Cl.
CPC ............ *C02F 1/20* (2013.01); *B01D 21/0084* (2013.01); *C02F 2103/18* (2013.01); *C02F 2209/42* (2013.01); *C02F 2301/063* (2013.01)

(58) Field of Classification Search
CPC .. C02F 1/20; C02F 2209/42; C02F 2301/063; C02F 2103/18; B01D 21/0084
(Continued)

(56) References Cited

U.S. PATENT DOCUMENTS

| 2,792,904 A | 5/1957 | Sebald ........................ 96/198 |
| 3,676,983 A | 7/1972 | Nold ........................... 96/196 |

(Continued)

FOREIGN PATENT DOCUMENTS

| CN | 201062264 Y | 5/2008 |
| CN | 101898855 A | 12/2010 |

(Continued)

OTHER PUBLICATIONS

International Search Report, PCT/EP2011/071851, 2 pages, dated Oct. 27, 2011.
(Continued)

*Primary Examiner* — T. Bennett McKenzie
(74) *Attorney, Agent, or Firm* — Ostrolenk Faber LLP

(57) ABSTRACT

A method and apparatus are disclosed for treating process water which is loaded with gaseous compounds and/or possibly with solids and comes from a wet-cleaning installation for cleaning process gas, e.g., from a melt-reduction subassembly or from a direct-reduction subassembly. Process water is introduced in a tank in a first process stage and degassed on the basis of reduced solubility of the dissolved compounds. The tank has, on its upper side, a gas-collecting chamber, in which the separated-off gases are collected and
(Continued)

from which these are discharged. Likewise, the treated process water is discharged from the tank via a drainage means.

25 Claims, 2 Drawing Sheets

(58) Field of Classification Search
USPC .............................. 95/149–266; 96/155–220
See application file for complete search history.

(56) References Cited

U.S. PATENT DOCUMENTS

| | | | |
|---|---|---|---|
| 4,028,072 A | 6/1977 | Braun et al. ..................... 96/181 |
| 4,316,725 A | 2/1982 | Hovind et al. .................. 95/248 |
| 5,614,102 A * | 3/1997 | Sakurada ............... B01D 21/01 |
| | | | 210/718 |
| 6,656,251 B1 * | 12/2003 | Claesson ................... C02F 1/20 |
| | | | 210/188 |
| 2002/0124728 A1 * | 9/2002 | Benderly ................ B01J 8/006 |
| | | | 95/183 |
| 2003/0150477 A1 * | 8/2003 | Suzuki ...................... B08B 3/00 |
| | | | 134/1.3 |
| 2004/0217058 A1 * | 11/2004 | Cadera ................ B01D 61/145 |
| | | | 210/649 |
| 2005/0166759 A1 * | 8/2005 | Ross ................. B01D 19/0042 |
| | | | 96/155 |
| 2007/0169305 A1 * | 7/2007 | Shea ...................... E01H 1/103 |
| | | | 15/320 |
| 2013/0284019 A1 | 10/2013 | Gstoettenmayr et al. ...... 95/158 |

FOREIGN PATENT DOCUMENTS

| | | | |
|---|---|---|---|
| DE | 2137982 A1 | 2/1972 | ............. B01D 19/00 |
| DE | 2451157 A1 | 4/1976 | ............... B01D 3/00 |
| DE | 3038940 A1 | 5/1981 | ............. B01D 19/00 |
| DE | 102007055297 A1 | 5/2009 | ............. B01D 19/00 |
| EP | 0 633 051 A1 | 1/1995 | |
| EP | 0633051 A1 | 1/1995 | ............. B01D 53/04 |
| RU | 2208598 C1 | 7/2003 | |
| RU | 2217383 C1 | 11/2003 | |
| RU | 2280012 C1 | 7/2006 | |
| UA | 48673 U | 8/2002 | |
| UA | 50249 U | 10/2002 | |
| WO | 2012/084480 A1 | 6/2012 | ................ C02F 1/20 |
| WO | WO 2012/084480 A1 | 6/2012 | |

OTHER PUBLICATIONS

Decision of Grant dated Feb. 11, 2016 in corresponding Russian Application No. 2013133922/05(050742) (10 pages).
Ukrainian Notice of Allowance dated Jun. 25, 2015 in corresponding Ukrainian Patent Application No. a201307887, along with an English translation of relevant portions thereof.
Examination Report dated Sep. 12, 2017 issued in corresponding Indian Patent Application No. 4509/DELNP/2013 with English translation.
Examination Report dated Aug. 1, 2017 issued in corresponding Canadian Patent Application No. 2,822,164.

* cited by examiner

METHOD AND APPARATUS FOR TREATING PROCESS WATER

CROSS-REFERENCE TO RELATED APPLICATIONS

This application is a U.S. National Stage application of International Application No. PCT/EP2011/071851 filed Dec. 6, 2011, which designates the United States of America, and claims priority to AT Patent Application No. A 2094/2010 filed Dec. 20, 2013. The contents of which are hereby incorporated by reference in their entirety.

TECHNICAL FIELD

This disclosure relates to a method and an apparatus for treating, in particular degassing, process water which is loaded with dissolved gaseous compounds, in particular with carbon dioxide ($CO_2$), carbon monoxide (CO) and possibly volatile organic substances and possibly with solids and comes from a wet-cleaning installation for cleaning process gas, in particular from a melt-reduction subassembly, particularly preferably from a melt gasifier or in particular from a direct-reduction subassembly, particularly preferably from a direct reduction hopper or a fluidized-bed reduction subassembly.

BACKGROUND

EP 0 633 051 A1 discloses cleaning liquids contaminated with pollutants by flushing the liquids with flushing gases, wherein the pollutants are driven out of the liquid by means of the flushing gas. Methods of this type are known as "stripping". It is disadvantageous here that a large quantity of flushing gas accumulates, which contains the gaseous pollutants and must subsequently be supplied for treatment.

DE 10 2007 055 297 A1 discloses cleaning wastewater, which contains dissolved gases, by means of a vacuum treatment and in the process removing the dissolved gases by means of degassing. In order to generate low pressure, steam ejectors are proposed. The disadvantage here however is the effort involved in generating a high low pressure.

SUMMARY

One embodiment provides a method for treating, for example degassing, process water which is loaded with dissolved gaseous compounds, in particular with carbon dioxide ($Co_2$), carbon monoxide (CO) and possibly volatile organic substances and possibly with solids and comes from a wet-cleaning installation for cleaning process gas, in particular from a melt-reduction subassembly, particularly preferably from a melt gasifier or in particular from a direct-reduction subassembly, particularly preferably from a direct reduction hopper or a fluidized-bed reduction subassembly, wherein the process water is introduced into a tank of a first process stage which is sealed off from the surrounding atmosphere by way of an entry element, wherein, upon entry, for degasification of the process water, the process water is subjected to a drop in pressure $\Delta p$, thereby resulting in a degasification on account of the reduced solubility of the dissolved gases, wherein the tank has a gas-collecting chamber on its top side and the fill level in the tank is controlled such that the separated gases can collect above the fill level in the gas-collecting chamber and can be discharged herefrom and the treated process water is discharged out of the tank by way of an outlet.

In a further embodiment, in order to increase the exchange of materials surface, process water is introduced into the gas-collecting chamber, in particular in a finely distributed form, by way of at least one facility for disperging process water.

In a further embodiment, the drop in pressure $\Delta p$ is generated upon entry of the process water through the entry element, wherein this is embodied in particular as a valve and/or as a nozzle and/or as a diaphragm and/or as a siphon.

In a further embodiment, the gases discharged from the tank are dried in a droplet separator and/or a heating facility and/or supplied to a filter and/or an absorber, in particular using an absorption means and the organic substances are separated.

In a further embodiment, the gases discharged from the tank are combusted or heated, wherein the organic substances are destroyed by means of oxidation and/or thermal decomposition.

In a further embodiment, the drop in pressure $\Delta p$ amounts to 0.1-10 bar.

In a further embodiment, a carrier gas, in particular air, nitrogen or steam, is introduced into the tank in order to assist with the degasification and/or cleaning process of dissolved or suspended solids, in particular on the underside of the tank.

In a further embodiment, foam and/or floating sludge arising during degasification and/or by the cleaning-off of suspended solids is removed from the gas-collecting chamber by way of a floating sludge drain.

In a further embodiment, the degassed process water and possibly solids deposited from the process water, in particular in the form of sediments, in particular in the area of the lowest point of the tank, are discharged, wherein the degassed process water is drawn off via a sealable outlet and/or a pump and/or at least one hydrocyclone or via a locking system and the solids are discharged the tank by way of a discharge facility.

In a further embodiment, the pressure in the tank is reduced as a function of the temperature of the process water such that the process liquid boils.

In a further embodiment, at least one part of the process water discharged from the tank is supplied for further treatment again to a first process stage as claimed in one of the above claims.

In a further embodiment, the treated process water is routed to a further process stage including at least one column suited to stripping the process water, wherein a further separation of at least gaseous compounds from the process water takes place.

In a further embodiment, the separation in the column in a spray tower takes place by contact of the sprayed process water with a gas flow, and/or in at least one bubble column, by blowing a stripping gas into the process water and/or in a packed column, with fillers and/or components for increasing the exchange of materials surface.

In a further embodiment, in the first process stage, the solids are discharged at least partially in the form of sludge, in particular rough and/or floating sludge, and the gaseous compounds and gaseous compounds remaining in the treated process water are discharged in the further process stage.

Another embodiment provides an apparatus for treating, in particular degassing, process water which is loaded with dissolved gaseous compounds, in particular with carbon dioxide ($Co_2$) and carbon monoxide (CO) as well as volatile organic substances and if necessary with solids, from a wet-cleaning installation for cleaning process gas, in particular from a melt-reduction subassembly, particularly preferable from a melt gasifier or in particular from a direct-reduction subassembly, particularly preferably from a direct reduction hopper or a fluidized-bed subassembly, having, in a first process stage, including a sealable tank, with a supply line, at least one entry element for entering process water into the tank, wherein the tank comprises a gas-collecting chamber on its top side, for receiving gaseous compounds separated from the process water, wherein a gas drain for the separated gases and possibly a floating sludge drain are provided in the upper area of the gas-collecting chamber and wherein the tank comprises a drain for the treated process water.

In a further embodiment, at least one facility for disperging process water into the gas-collecting chamber is provided in the gas-collecting chamber for increasing the exchange of materials surface.

In a further embodiment, the entry element is embodied as a valve and/or as a nozzle and/or as a diaphragm and/or as a siphon.

In a further embodiment, the gas drain is connected to a droplet separator and/or a heating facility for drying the gases discharged from the tank and/or to a filter or an absorber in particular using an absorption means, for separating gaseous substances.

In a further embodiment, the tank, on its lower side, has a gas distributor for introducing a carrier gas, in particular air, for the cleaning-off of dissolved or suspended solids, wherein the facilities comprise a plurality of openings and are arranged at least in an area of the tank below the gas-collecting chamber.

In a further embodiment, at least one gas distributor, in particular a static gasification tray, a gasification tube, a gasification rod, a gasification vessel or a dynamic gasification facility is provided in the tank for disperging a carrier gas in the process water and increasing the exchange of materials surface.

In a further embodiment, in the area of the lowest point of the tank, a lock-out facility, for locking out deposited solids is provided and that the drain includes a sealable outlet and/or a pump and/or at least one hydrocyclone or locking system, for draining treated process water from the tank.

In a further embodiment, a provision is made for a second process stage, including at least one column suited to stripping the process water, which is connected via the drain or a drain to the first process stage from a hydrocyclone for the treated process water which is arranged in the tank.

In a further embodiment, the column is embodied as a spray tower, with a separation by contact of the sprayed process water by means of a gas flow, or as at least one bubble column, with a separation by blocking a stripping gas into the process water, or as a packed column, with a separation by means of bulky solids, in particular bulky solids made of carbon, coke or ore.

In a further embodiment, at least one combustion facility is provided for oxidation and/or thermal decomposition of the separated gaseous compounds from the first and/or second process stage.

In a further embodiment, the tank is embodied as a cylindrical and/or boiler-type element arranged at an incline and the gas-collecting tank arranged above the tank as a vertically aligned tank part.

In a further embodiment, the tank is a cylinder open at the bottom, which is immersed at least partially into process water.

BRIEF DESCRIPTION OF THE DRAWINGS

Exemplary embodiments will be explained in more detail below based on the schematic drawings, wherein.

DETAILED DESCRIPTION

Figure 1:
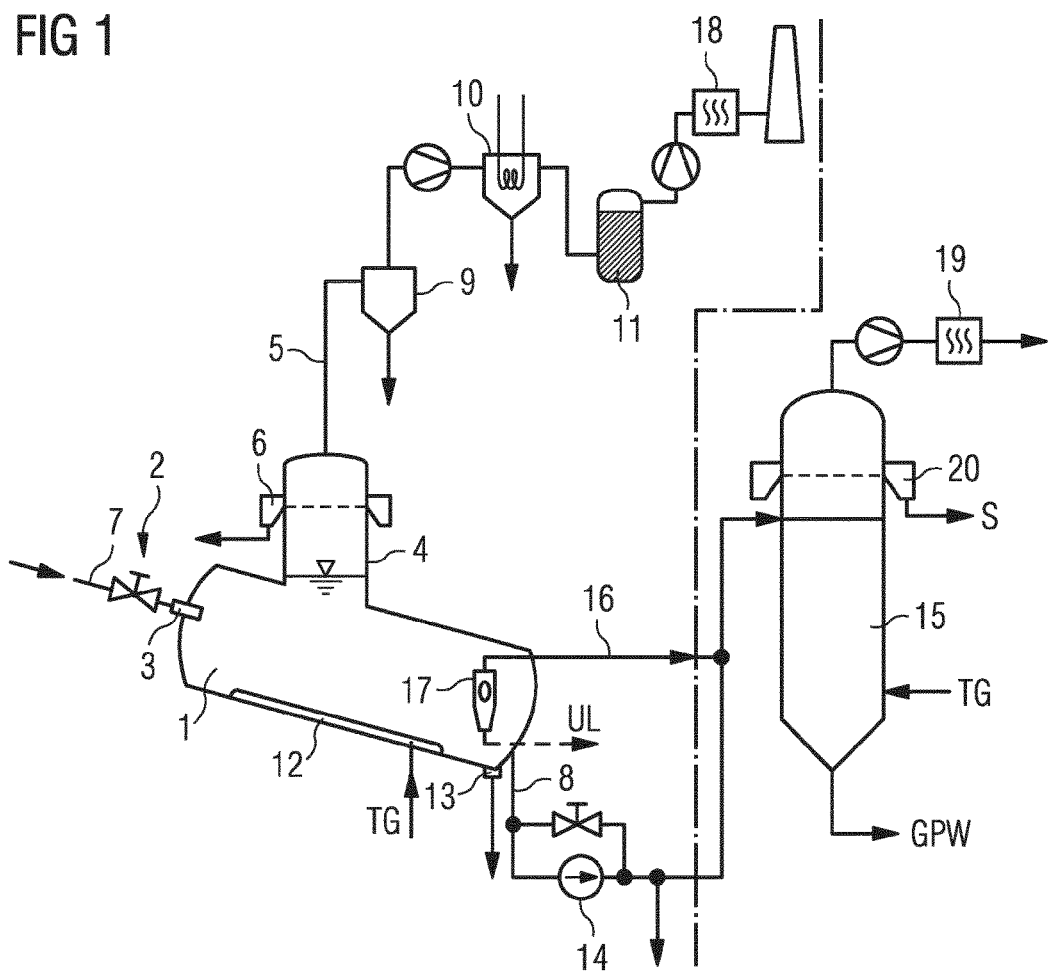
FIG. 1 shows a first example embodiment of an apparatus and method for treating a process water loaded with gaseous compounds and solids.

Embodiments of the present disclosure provide a method and an apparatus, which simply and reliably enable treatment of a process water which is loaded with gaseous compounds and possibly solids.

Process water of this type accumulates for instance during the wet cleaning of process gases, such as for instance reduction gas, from a melt-reduction subassembly.

Iron ore production methods, such as for instance COREX or FINEX, naturally generally use carbon carriers, in particular hard coal as an energy carrier. The release of energy takes place by degassing the carbon carrier with oxygen in a fixed bed of a reactor referred to as a melt gasifier essentially into CO and $H_2$. The hot gas produced by this method penetrates the fixed bed in the counter current and thus warms up the carbon carrier charged in the process. Natural carbon carriers, unlike blast furnace cokes, contain, in addition to water, also volatile components. Based on the surface of the fixed bed, a drying and separation of the volatile components of the carbon carrier therefore takes place successively during the course of the heating process. The volatile components may, in addition to an organic gaseous compounds such as CO, $CO_2$, $H_2$, also contain organic substances. It is significant for such methods that the organic substances are converted by secondary reactions in the hot gas atmosphere above the fixed bed at temperatures of above 1000° C. into compounds such as $H_2$, CO, $CH_4$ and soot. The efficiency of this conversion can however be negatively affected by the following factors:

excessively low gas temperatures in the melt gasifier dome on account of irregular operating states or incorrect modes of operation, a high dust content in the charged coal in conjunction with a too minimal dwell time of the dust particle in the hot gas atmosphere of the melt gasifier unfavorable arrangement of the gas outlet from the dome relative to the coal entry.

Part of the hot gas escaping from the melt gasifier can be subjected to a wet cleaning process in order to obtain cooling gas, after passing through a dry roughing process for instance. Similarly, the exhaust gas (top gas) of a reduction zone (reduction hopper or fluidized-bed system) arranged upstream of the melt gasifier is subjected to a wet cleaning process, wherein the gas routed to the reduction zone represents a mixture of uncleaned hot gas from the melt gasifier and possibly the cooling gas. The organic substances CO and/or $CO_2$ are partly condensed in such cases into the facilities for wet cleaning and transferred into the process water. In this case, when treating process water, which includes a degasifier facility, settling basins and a cooling tower, this may result in the entry of organic substances CO and/or $CO_2$ into the ambient air. This must be prevented on account of the afore-cited partially toxic properties of these substances. Furthermore, the pH value of the process water is reduced to such a degree by the dissolved $CO_2$ that this has a negative affect on the downstream process water system.

This may result on the one hand in corrosion problems and/or by uncontrolled outgassing of $CO_2$ in deposits in the process water system.

The object is achieved in that the process water is introduced by way of an entry element into a sealed tank of a first process stage, in which process stage the process water is subjected to a drop in pressure $\Delta p$ so that degassing takes place on the basis of reduced solubility of the gases dissolved in the process water. The tank has, on its top side, a gas-collecting chamber. The fill level in the tank is controlled such that the separated gases are collected above the fill level in the gas-collecting chamber and can be discharged herefrom. The treated process water is discharged from the tank via an outlet.

Some embodiments therefore benefit from the reduced solubility of gases in process water, wherein this reduced solubility is caused by reducing pressure. A possible spontaneous drop in pressure may result in an effective outgassing of the dissolved gases from the process water. It is also conceivable here for the drop in pressure to be implemented in more than one stage. The absolute pressure is defined by the operating pressure of the system, from which the process water comes, but may, if necessary, also be reduced accordingly, wherein a low pressure can also be set in respect of the atmospheric pressure. Conventional process water pressures amount to up to 10 bar during the process of wet cleaning and are released by level regulation. The setting of a low pressure is advantageous in that the diversion of gases into downstream treatment facilities can largely be prevented.

According to one embodiment of the method, process water is introduced, in particular finely distributed, via at least one facility for dispersing process water, into the gas-collecting chamber, in order to increase the exchange of materials surface. Here process water is finely distributed in the gas-collecting chamber, thereby resulting in the dissolved gases being separated and thus in the dissolved gases being transferred into the gas-collecting chamber.

The entry of the process water can also take place directly into the tank below the fill level, thereby enabling a combined entry into the gas-collecting chamber below the fill level and in a finely distributed manner.

According to one embodiment of the method, the drop in pressure $\Delta p$ upon entry of the process water is generated by the entry element, wherein this is embodied in particular as a valve and/or as a nozzle and/or as a diaphragm and/or as a siphon. The embodiment of the entry element can be selected according to requirements. The drop in pressure can take place between the wet cleaning and the first process stage, particularly upon entry into the first process stage.

A combination with a valve is conceivable, so as also to be able to perform a control of the flow quantity in this way. According to a particular embodiment of the inventive method, the gases discharged from the tank are dried in a droplet separator and/or heating facility and/or supplied to a filter and/or an absorber, in particular using an absorption means, and the organic substances are separated. During the course of the degassing, the gases drop out of the process water and rise in the tank into the vertically aligned tank part, wherein it may also occur that moisture is also carried along during the drainage process. It may therefore also be necessary to dry the discharged gas so as to be able to supply it for further treatment. In accordance with the invention, this drying process can take place in a droplet separator and/or a heating facility. Furthermore, it may be necessary to filter the discharged gases in order to protect the fan required to establish the low pressure from solid and/or condensed substances such as tar. Furthermore, an adsorber can be provided in order to release the gas from toxic organic substances. Filters and adsorbers can be arranged separately or also form one unit.

One embodiment of the method provides that the gases discharged from the tank are combusted or heated, wherein the organic substances are destroyed by means of oxidation and/or thermal decomposition. The thermal decomposition allows for toxic, complex, organic compounds to be thermally destroyed at high temperatures, thereby converting these to form non-poisonous or less problematic substances.

According to one embodiment of the method, the drop in pressure $\Delta p$ amounts to 0.1-10 bar and takes place during the controlled introduction of process water into the tank. The introduction of the process water via a valve, which can be controlled, allows the flow quantity to be defined and the spontaneous drop in pressure upon entry of the process water via the valve can be set by way of the changes from a narrow flow cross-section in the valve to the tank cross-section. The process water quantity can be linked to the level regulation of the washer, since viewed over a longer period of time, approximately just as much water has to be discharged from the washers as is supplied. Additional water may develop by condensing the gas. The valve between the wet cleaning and the inlet into the tank may have a function which compliments the valves of the level regulation into the washers. The level regulation of a washer may alternatively at least partially assume the function of this valve.

According to a particular embodiment of the method, in particular on the lower side of the tank, a carrier gas, in particular air, nitrogen or steam, is introduced into the tank in order to assist with the degassing and/or cleaning-off of dissolved or suspended solids. The introduction advantageously takes place by way of a plurality of openings, which are arranged in a wide area across the underside of the tank, at least however in the area below the vertical tank part. Furthermore, it is possible to simultaneously introduce carrier gas at different points of the tank, for instance also together with the introduced process water. The carrier gas can therefore be distributed as evenly as possible into the tank and thus introduced into the process water to be treated. On account of the rising carrier gas bubbles, dissolved gas is carried out of the process water and flushed into the gas-collecting chamber. Solids are likewise also flushed out upwards.

A further embodiment of the method provides that when degassing and/or by cleaning suspended solid substances, foam and/or floating sludge which develops is carried out of the gas-collecting chamber by way of a floating sludge drain. The separate drain from the gas-collecting chamber allows the floating solids or solids bound to foam to be reliably removed from the first process stage and thus from the process water. Furthermore, the moisture of the separated gas is as a result reduced. The foam and/or floating sludge which is carried out can be treated by means of suitable measures, such as for instance drying, heating or flushing and solid particles contained therein are obtained.

According to one embodiment of the method, the degassed process water and possibly solids deposited from the process water, in particular in the form of sediments, are in particular discharged in the area of the lowest point of the tank, wherein the degassed process water is drawn-off via a sealable outlet and/or via a pump and/or via at least one hydrocyclone or via a locking system and the solids are locked out of the tank by way of a lock-out facility. The process water can be drained-off using the residual pressure or drawn-off by a pump with a pressure increase. When using a hydrocyclone, a drop in pressure occurs in a process-related manner in the hydrocyclone, wherein solids separated in this way are discharged by way of a so-called underflow. On account of the use of one or also a number of hydrocyclones which are connected in parallel or a number of hydrocyclones which are connected in series or a system comprising hydrocyclones connected in parallel or in series, it is also possible to separate finer suspended solids from the process water so that a further cleaning process results when draining-off the already cleaned process gas. Furthermore, a fractioned separation can be achieved in this way, so that an enrichment of resources can be achieved during the course of the hydrocyclonization.

Hydrocyclones are centrifugal force separators for liquid-solid mixtures (suspensions). Solid particles contained in suspensions can be separated or graded using hydrocyclones. The suspension to be treated is introduced tangentially into a cylindrical segment, wherein the suspension is routed on a circular path. A swirl which forms in the process is directed downwards, in which the suspension flows upwards. In a tapering conical segment, volume is displaced inwards. An inner swirl directed upwards forms in such cases, which is discharged through an upper drain. The heavier or rougher solids remain on the wall of the cyclone and are discharged by way of the so-called underflow. The specifically lighter or finer-grained components are discharged through the upper drain (also overflow).

According to one embodiment of the method, the pressure in the tank is reduced as a function of the temperature of the process water such that it results in the process liquid boiling. The known physical effect, according to which the boiling temperature depends on the pressure, can be used such that gases escaping from the boiling process water improve the degasification effect and in the process also improve the extraction of solids, such as for instance suspended solids.

According to one embodiment of the method, at least one part of the process water discharged from the tank is supplied for further treatment again to a first process stage. The repeated treatment allows the degasification of the process water and separation of solids from the process water to be improved again. In this process the process water which has already been treated can once again be introduced into the same tank or treated in a subsequent process stage which is identical to the first.

One embodiment of the method provides that the treated process water is routed to a further process stage including at least one column suited to stripping the process water, wherein a further separation of at least gaseous compounds from the process water takes place.

Stripping in a column is understood by the person skilled in the art as a procedure in which dissolved compounds are driven out of the liquids and discharged as gases. Use is made here of the steam pressure of a dissolved gas in the liquid being higher than that in a carrier gas, so that the dissolved gas can be passed into the gas phase. One possible variant is a guiding of the liquid to be treated in the counter flow to a gas flow in a in most instances cylindrical vessel, which is referred to as a column.

The further process stage allows even lower residual quantities of dissolved gases to be achieved, wherein on account of the separation into two stages, each process stage can be set separately and the separation thus optimized.

One embodiment of the method provides that the separation in the column takes place in a spray tower, by contact of the sprayed process water with a gas flow, or in at least one bubble column, by blowing a strip gas into the process water, or in a packed column, with fillers and/or fittings to increase the exchange surface. The type of separation can be adjusted accordingly. Aside from unpacked columns (spray tower, bubble column), packed columns are also useful since here by contact of an upwardly flowing liquid film with a gas flow, the contact between gas and liquid phase becomes more intensive and the separation process thus still more complete. It is also possible to arrange a number of unpacked separator stages in series in so-called tray columns, wherein the separator stages are realized in a tank.

Bulky raw materials, which can be employed in the column in a reduction or melting reduction process after their use, are advantageous as fillers or filling elements, since, on account of dirt in the process water, relatively high exchange rates must be anticipated. Exchange rate is here the quantity of filler to be replaced within a specific time frame, in respect of the process water flow of the column. Self-cleaning packages, such as wood packages, are also conceivable in this function.

According to one embodiment of the method, in the first process stage the solids in the form of sludge, in particular rough and/or floating sludge, and the gaseous compounds are discharged at least partially and, gaseous compounds remaining in the treated process water are discharged in the further process stage. The two-stage method management allows the first process stage to be operated such that an almost complete separation of solids results in the form of rough and floating sludge. Aside from floating sludge, which on account of its density which is smaller than water, floats statically, floating product can also occur which appears on account of the so-called flotation effect of the stripping gas. During the flotation effect, solid particles are dragged with gas bubbles to the water surface and discharged with the foam from the tank.

The first process stage is therefore optimized for the separation of solids for instance. This can be achieved in that none or only minimal carrier gas is blown into the tank of the first process stage, so that this also does not disturb the sedimentation of solid particles in the tank.

The second process stage is optimized for the stripping process. The charged process water can be poured in the head area of the column for instance, since sedimentation is not intended here. By pouring the loaded process water into the second process stage, an exchange of material between liquid and gas can be realized in accordance with the counter current principle. An optimal separation effect of the column results herefrom.

Other embodiments provide an apparatus including a tank which is sealed off from the surrounding atmosphere with an entry element, for entering process water into the tank, has a gas-collecting chamber on its top side, which is used to receive gaseous compounds separated off from the process water. In the upper area of the gas-collecting chamber, provision is made for a gas drain for the separated gases and possibly a floating sludge drain and a drain for the treated process water. The inventive apparatus thus has a separation of dissolved gases and a sedimentation of solids, thereby enabling a reliable and simple removal of the gases and sediments. A collection of separated gases is achieved by means of the gas-collecting chamber, wherein from the lowest possible moisture level of the separated gases is achieved.

According to one embodiment of the apparatus, at least one facility for dispersing process water into the gas-collecting chamber is provided in the gas-collecting chamber in order to increase the exchange of material surface. The fine distribution of process water causes dissolved gases to move out of the process water into the gas of the gas-collecting chamber, wherein these gases remain in the gas-collecting chamber and can be discharged therefrom.

According to one embodiment of the apparatus, the entry element is embodied as a valve and/or as a nozzle and/or as a diaphragm and/or as a siphon. A combination with a valve or a further valve is conceivable, in order thus to also be able to perform a regulation of the flow quantity. A combination with a buffer is also conceivable in order to balance out the influence of brief fluctuations in the process water quantity. The entry element can also be adjusted for instance by exchange, wherein an adjustment to operating pressures or also to flow quantities can be performed. The siphon can be formed by an upwardly directed pipe loop, wherein a differential pressure is required in order to overcome the static head. A combination of the entry element with a valve is possible.

One embodiment of the apparatus provides that the gas drain is connected to a droplet separator and/or a heating facility, for drying the gases discharged from the tank and/or to a filter and/or an absorber, in particular using an absorption means, for separating gaseous substances. For the further processing of the gases, it may also be advantageous to remove the residues of moisture. The thus dried gases can then be supplied for evaluation or conversion treatment. The combination of droplet separator and heating facility allows an almost complete removal of the moisture. A carrier gas treated by means of absorbers can also be used again for stripping processes.

The filter is used to remove condensed substances. Aside from absorption, adsorption can also be used to remove gaseous substances. Adsorption uses solids, in particular solid ballast, to remove liquid substances (washing liquids). Substances with a high inner surface, such as for instance active carbon, are used as adsorbents. These substances are loaded and unloaded cyclically. A mixture of water and substances which has to be further treated accumulates as a product of the adsorption/absorption. The adsorbent can thus be the same as the filter. The adsorbent should thus be selected such that deactivated adsorbents can be supplied in the process. A loaded washing liquid (washing oil), which is prepared by means of distillation, accumulates during the adsorption process.

According to one embodiment of the apparatus, the tank, on its underside, has a gas distributor for introducing a carrier gas, in particular air, for cleaning off dissolved or suspended solids, wherein the facility comprises a plurality of openings and is arranged at least in an area of the tank below the gas-collecting chamber. The facility thus ensures the most even possible distribution of carrier gas, so that carrier gas passes through a large volume of the process water in the tank. Carrier gas should advantageously pass through at least the area below the gas-collecting chamber.

According to one possible embodiment of the apparatus, provision is made in the tank for dispersing a carrier gas in the process water and for increasing the exchange of materials surface for at least one gas distributor, in particular a static gasification base, such as a gasification tube, a gasification rod, a gasification vessel or a dynamic gasification facility. As large an exchange of materials surface as possible is advantageous for optimal degasification, which can be achieved by the cited variants. The carrier gas is in this way as fine as possible and distributed evenly in the process water to be treated and in this way dispersed.

According to one embodiment of the apparatus, provision is made in the area of the lowest point of the tank for a discharge facility, for discharging settled solids, and the drain includes a sealable outlet and/or a pump and/or at least one hydrocyclone or a locking system, for draining treated process water out of the tank. The provision of a pump enables the treated process water to be discharged and withdrawn using suction in a controlled manner.

A hydrocyclone allows for a further separation of solids in the form of a thicker suspension across a so-called underflow. One possible variant consists in providing one or also a number of hydrocyclones which are connected in parallel and/or in series, wherein finer suspended solids can also be separated from the process water. During the course of draining the already cleaned process gas across the at least one hydrocyclone, a further cleaning effect thus takes place.

A further cost-effective solution represents a locking system, which is advantageous in that the pressure level of the discharged process water changes correspondingly and can thus be adjusted to subsequent process steps and/or also decoupled in respect of the pressure.

According to a further embodiment of the apparatus, provision is made for a second process stage, including at least one column suited to stripping the process water, which is connected to the first process stage by way of the drain for the treated process water. The second separate process stage enables the first and the second process stage to be set separately from one another respectively and thus the degasification and/or separation of solids from the process water to be optimized for instance. One possible variant consists in a significant separation of solids in the form of sludge being achieved in the first process stage, wherein an at least partial degasification also takes place and an almost complete degasification is achieved in the second process stage.

According to one embodiment of the apparatus, the column is embodied as a spray tower, with a deposition by contact of the sprayed process water by means of a gas flow, or as at least one bubble column, with a deposition by blowing a stripping gas into the process water, or as a packed column, with a deposition of bulky fillers, in particular bulky process substances made of coal, coke or iron. The type of column can be selected according to requirements. In so-called tray columns, a number of unpacked separator stages can also be arranged in series, wherein a number of separator stages are realized in a tank. These separator stages may comprise for instance sieve plates, dual flow floors (liquid and gases escape through the same openings), bubble cap trays or valve trays.

In the case of a packed column, the fillers disadvantageously accumulate for cleaning, reutilization or disposal. This process-specific disadvantage can be balanced out by the use of process substances of the metallurgical method, because the loaded process substances can be thermally converted during the course of the metallurgical method and the problem substances can also be destroyed. Furthermore, the use of packed columns is advantageous in that contact between the gas and liquid phases takes place here very intensively and the separation of dissolved gases, in other words the transfer of substances dissolved in the liquid phase into the gas phase thus takes place to a greater degree.

According to one embodiment of the apparatus, at least one burner facility is provided for oxidation and/or thermal decomposition of the separated gaseous compounds from the first and/or second process stage. The combustion of the separated gaseous compounds, which often contain organic compounds, results in a thermal decomposition or oxidation, wherein the organic substances can be destroyed and transformed into less problematic substances.

One possible embodiment of the apparatus provides that the tank is embodied as a cylindrical or boiler-type body arranged at an incline and the gas-collecting chamber arranged above the tank is embodied as a vertically aligned tank part. During the sedimentation of solids, the inclined arrangement results in solids predominantly depositing in the area of the lowest point of the tank, so that these can be easily removed. Similarly, separated gas collects in the gas-collecting chamber arranged above. The incline of the tank and position of the gas-collecting chamber can be defined according to requirements. A tank arranged at right angles represents a special case, wherein the gas-collecting chamber is formed by the topmost part of the tank and no longer by a separate tank part.

A further embodiment of the apparatus provides that the tank is a cylinder which opens downwards, which is immersed at least partially into process water. In this embodiment, no closed tank is required, the sealing-off from the surrounding atmosphere is achieved in this case by the tank being arranged immersed in the process water. In particular, the tank can in this case be immersed in a process water collecting tank embodied as a tub. The operating pressure is then essentially operated at ambient pressure.

FIG. 1 shows an apparatus with a first and a second process stage. The separation of the process stages is indicated by a dotted line. Process water leaves a wet cleaning system for cleaning process gas, such as reduction gas, e.g. from a melting reduction system (not shown), into the sealable tank 1, which is embodied in one possible embodiment as an tank arranged at an incline, via a supply line 7, in which a valve 2 and a nozzle 3 can be arranged. The supply line 7 can be arranged on a side of the tank 1, above it or below it.

On account of a spontaneous drop in pressure $\Delta p$ upon entry of the process water across the entry element, which can be embodied as a nozzle 3, into the tank 1, a degasification of dissolved gaseous substances results from the process water, since the solubility of compounds dissolved in process water is reduced significantly under the present conditions. The selection of the drop in pressure and also the absolute pressure level at which the method is operated can be varied accordingly, wherein conventional process pressures, from which the process water is taken, have to be taken into account.

The gaseous compounds occurring rise in the tank in the process water and collect in an upper gas-collecting chamber 4 arranged on the tank 1, which can be embodied as a vertically aligned tank part 4. The fill level in the tank 1 and/or in the gas-collecting chamber 4 is set such that a space free of process water always remains in the gas-collecting chamber 4. Gas distributors 12 for introducing a carrier gas TG are provided on the tank underside, wherein the facilities have a plurality of openings and are arranged at least in a area of the tank 1 below the gas-collecting chamber. Additionally dissolved compounds are driven out of the process water by means of the carrier gas TG, which rises in the form of a plurality of finely distributed gas bubbles. Furthermore, suspended solids are also separated from the process water and driven upwards. This can result in a formation of foam in the gas-collecting chamber 4, which can be discharged by way of a floating sludge discharge 6. This may also result in the formation of floating sludge on account of suspended solids which are separated from the process water. This floating sludge is discharged in the same way as the foam and can be supplied for processing (e.g. heating, drying or flushing).

It is also conceivable to provide facilities for disperging process water into the gas-collecting chamber in the gas-collecting chamber 4. The separated gases then collect in a chamber via the facilities for disperging and can be withdrawn herefrom.

The separated gases which are collected in the gas-collecting chamber 4, are supplied via a gas line 5 to a droplet separator 9 and a heating facility 10 and in this way dried. The dried gas can be treated further in a filter 11, which can be embodied as an absorber or an adsorber. Problem substances are deposited on an absorber in an absorber. The thus treated gas can now, if necessary after a compression, be thermally converted in a combustion facility 18 and/or oxidized, wherein the toxic compounds are destroyed. Furthermore, this treated gas can be at least partially used also as a carrier gas TG.

The tank 1 can however also be operated without the supply or with a reduced supply of carrier gas TG, wherein an even better separation of solids from the process water results by sedimentation. Here the solids drop to an area close to the lowest point of the tank 1 and can then be discharged from the tank 1 by way of a discharge facility 13.

During a joint operation of the first and second process stage, this procedure is advantageous, so that the solids are largely separated from the tank in the first process stage and the thus treated process water is supplied for further treatment of the process water after its withdrawal from the tank 1 to the column 15. Despite the reduced quantity of carrier gas TG or also without carrier gas TG, an at least partial separation of dissolved compounds is consequently achieved from the process water.

The draining-off of the process water can take place by way of a locking system, by way of a sealable outlet and/or with a pump 14 and/or by way of at least one hydrocyclone 17 or a group of hydrocyclones which are connected in parallel or in series having a drain 16. The drain 16 can also be equipped with a pump for drawing off the process water. The at least one hydrocyclone can be arranged in the tank 1 or also outside of the tank 1. The parallel circuit allows for an optimal design of the hydrocyclone for the separation task, namely irrespective of the quantity of process water to be cleaned.

During operation of hydrocyclones, a so-called underflow UL occurs in a process-related manner, which can be fed to a treatment unit. When the hydrocyclone 17 is arranged in the tank 11, the solids condensed in the underflow are sedimented out and carried out of the tank 1 via the lock-out facility 13 as sludge and are supplied for further processing which includes a drainage for instance. In the event of an arrangement of the hydrocyclone/s 17 outside of the tank 1, the underflow directly delivers the sludge suited to a further processing. The further processing includes for instance a mechanical drainage. Facilities such as decanters or chamber filter presses or further hydrocyclones are suited hereto. The thus drained sludge can (possibly after agglomeration) be fed back into the process and supplied for further use. The water obtained during the drainage process can be fed again to the process water circuit (e.g. prior to process water treatment).

In the column 15, the process water is then degassed, with this occurring in the unpacked or also packed columns. On account of the solids already separated in the first process stage, interferences due to suspended solids, such as for instance a sedimentation of solids in the fillers, may no longer result in the column, so that a very high separation rate of the dissolved compounds is always achieved. The column 15 can be flushed by means of a carrier gas TG. During operation of the column, developing foam S can be discharged out of the column 15 by way of a foam drain and eliminated by means of heating, drying or flushing.

The gases separated in the column 15 can in turn be supplied for drying or filtering purposes, or also thermally converted in a combustion facility 19. Furthermore, these gases can be used at least partially also as carrier gas TG. The now almost completely prepared process water GPW only exhibits very little quantities of solids and dissolved compounds and can therefore be supplied again for use, wherein it can be fed to the process again into the sedimentation basin of a conventional water treatment system. A carrier gas treated by means of an absorber can also be used again for stripping purposes.

Figure 2:
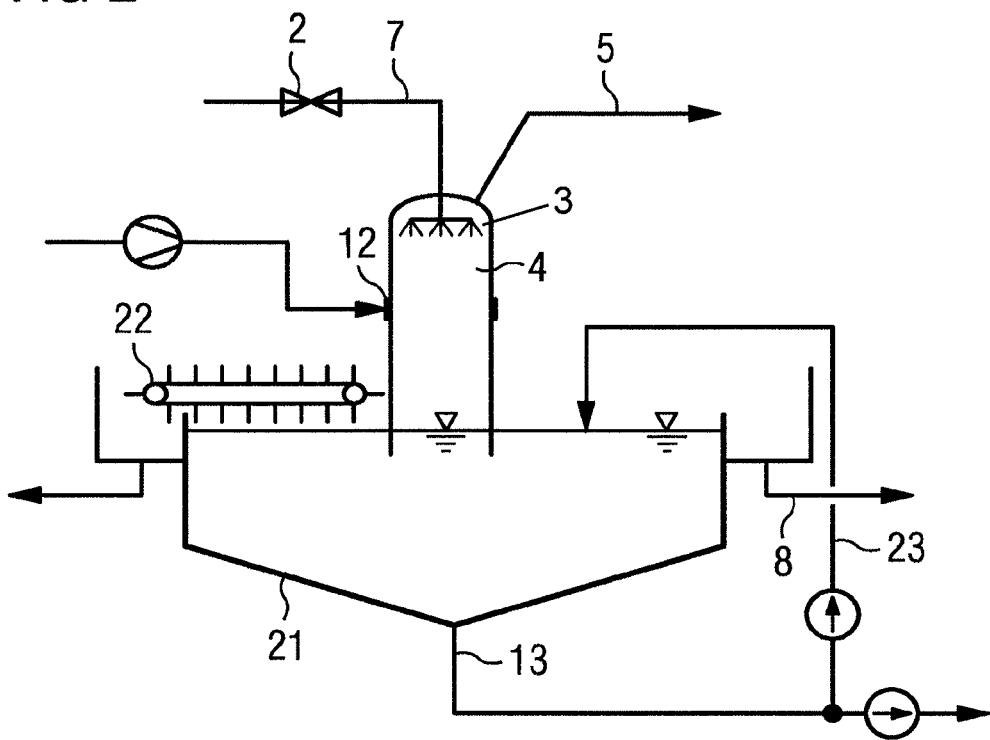
FIG. 2 shows a first example embodiment of an apparatus and method for treating a process water loaded with gaseous compounds and solids.

FIG. 2 shows a particular embodiment with a gas-collecting chamber 4, which is formed by a tank which opens downwards, which is immersed in a process water collecting-chamber filled with process water. A supply line 7 opens into the gas-collecting chamber 4, which is connected to nozzles 3. The nozzles 3 subject the process water to a drop in pressure and are finely distributed in the gas-collecting chamber 4. The gases separated from the process water are discharged from the gas-collecting chamber 4 via a gas drain 5. Carrier gas TG is introduced into the gas collecting chamber 4 by way of a gas distributor 12 (not shown in further detail). Degassed process water collects in the process water collecting tank 21. Foam or floating sludge produced in this water can be drawn off by way of a scraper 22. The degassed process water can be discharged by way of a drain 8. Deposited solids can be carried out of the process water collecting tank 21 by way of a lock-out facility 13. The coagulation of suspended solids used for recycling purposes.

Figure 3:
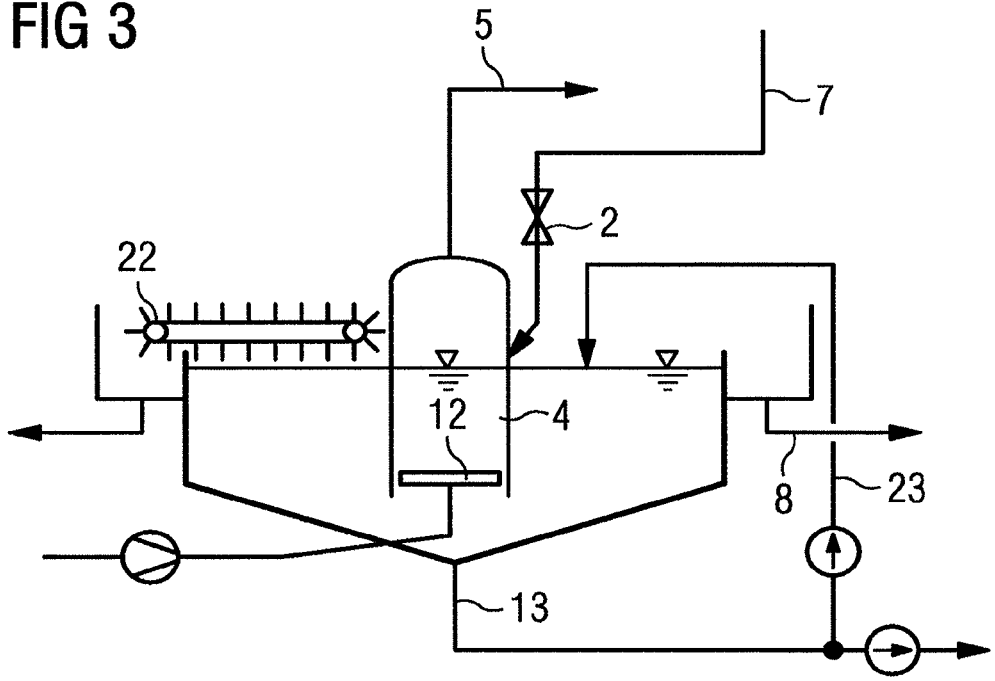
FIG. 3 shows a first example embodiment of an apparatus and method for treating a process water loaded with gaseous compounds and solids.

FIG. 3 shows a further possible variant. The tank forming the gas-collecting chamber 4 again immerses in a process water collecting tank 21 filled with process water. In the inner, lower area of the tank, which forms the gas-collecting chamber 4, a gas distributor 12 is arranged, so that carrier gas can rise through the process water within the tank. In this way a bubble column is formed, which brings about a degasification of the process water inside the tank. The distance between the gas distributor 12 and the process water level in the gas-collecting chamber 4 is selected such that a sufficiently large bubble column height is formed, in which by contact of the carrier gas with the process water, a degassing of the process water results. Process water is introduced into the gas-collecting chamber 4 by way of a supply line 7. The separated gases are drawn off from the gas-collecting chamber by way of a line 5.

LIST OF REFERENCE CHARACTERS

1. Tank
2. Valve
3. Nozzle
4. Gas-collecting chamber
5. Gas drain
6. Floating sludge drain
7. Supply line
8. Drain
9. Droplet separator
10. Heating facility
11. Filter (Absorber, Adsorber)
12. Gas distributor
13. Lock-out facility
14. Pump
15. Column
16. Drain from the hydrocyclone
17. Hydrocyclone
18. Combustion facility of the first process stage
19. Combustion facility of the second process stage
20. Foam drain
21. Process water collecting tank
22. Scraper
23. Return

What is claimed is:

1. An apparatus for degassing process water loaded with dissolved gaseous compounds comprising at least one of carbon dioxide $CO_2$, carbon monoxide (CO), volatile organic substances, and solids, the process water received from a wet-cleaning installation for cleaning process gas, the apparatus comprising:

in a first process stage including in a sealable tank with a supply line at least one entry element for entering process water into the tank, wherein the tank comprises a gas-collecting chamber on a top side of the tank for receiving gaseous compounds separated from the process water, and a gas drain for the separated gases and a floating sludge drain is provided in an upper area of the gas-collecting chamber, wherein:

the tank comprises:

a drain for the treated process water, and a discharge facility for discharging solids separated from the process water, the discharge facility being provided in an area of a lowest point of the tank, wherein the drain includes at least one of a sealable outlet, a pump, and at least one hydrocyclone, the drain draining treated process water from the tank, the at least one entry element subjects the process water to a drop in pressure, and the at least one entry element distributes the process water in the gas-collecting chamber, and the at least one entry element comprises a nozzle which finely distributes the process water in the gas-collecting chamber.

2. The apparatus of claim 1, wherein the at least one entry element comprises a valve.

3. The apparatus of claim 1, wherein the at least one entry element comprises a diaphragm.

4. The apparatus of claim 1, wherein the at least one entry element comprises a siphon.

5. The apparatus of claim 1, wherein the tank further comprises a scraper for removing foam or floating sludge from the degassed process water in the tank.

6. The apparatus of claim 1, wherein the gas drain is connected to at least one of a heater, and a filter, the heater being configured to dry the gases discharged from the tank, and the filter being configured to separate gaseous substances.

7. The apparatus of claim 1, comprising a gas distributor on a lower side of the tank for introducing a carrier gas for the cleaning-off of dissolved or suspended solids, wherein the gas distributor comprises a plurality of openings and the gas distributor is arranged at least in an area of the tank below the gas-collecting chamber.

8. The apparatus of claim 1, wherein at least one of a gasification tube, a gasification rod, a gasification vessel, and a dynamic gasification facility is provided in the tank for disperging a carrier gas in the process water and for increasing the exchange of materials surface for at least one gas distributor.

9. The apparatus of claim 1, wherein the apparatus comprises in a second process stage a column which is embodied as at least one of a spray tower with a separation by contact of the sprayed process water by means of a gas flow, at least one bubble column with a separation by blocking a stripping gas into the process water, and a packed column with a separation by means of bulky solids made of carbon, coke or ore.

10. The apparatus of claim 1, comprising at least one burner for oxidation or thermal decomposition of the separated gaseous compounds from at least one of the first process stage and a second process stage.

11. The apparatus of claim 1, wherein the tank is a cylinder open at the bottom, which is immersed at least partially into process water.

12. The apparatus of claim 1, wherein the drain for the treated process water feeds the treated process water, in a second process stage, into a column for further degassing of the process water.

13. A method for degassing process water loaded with dissolved gaseous compounds comprising at least one of carbon dioxide ($Co_2$), carbon monoxide (CO), volatile organic substances, and solids, the process water coming from a wet-cleaning installation for cleaning process gas, the method being performed with the apparatus of claim 1 and comprising:
    introducing the process water into the tank of the first process stage that is sealed off from the surrounding atmosphere by the at least one entry element,
    for degasification of the process water, subjecting the process water is subjected to the drop in pressure upon entry into the tank, thereby resulting in a degasification due to the reduced solubility of the dissolved gases,
    controlling a fill level in the gas-collecting chamber of the tank such that the separated gases collect above a fill level for discharge from the tank,
    discharging from the tank the degassed process water and solids deposited in the area of the lowest point of the tank from the process water in the form of sediments, and
    drawing off the degassed process water via at least one of the sealable outlet, the pump, and the at least one hydrocyclone, and discharging the solids via the discharge facility.

14. The method of claim 13, comprising introducing the process water into the gas-collecting chamber in order to increase the exchange of materials surface.

15. The method of claim 13, wherein the drop in pressure is generated upon entry of the process water through the at least one entry element, which comprises at least one of a valve, a diaphragm, and a siphon.

16. The method of claim 13, comprising drying the gases discharged from the tank in at least one of a droplet separator and a heating facility, supplying the dried gases to at least one of a filter and an absorber, and separating the organic substances.

17. The method of claim 13, wherein the gases discharged from the tank are combusted or heated, wherein the organic substances are destroyed by means of at least one of oxidation and thermal decomposition.

18. The method of claim 13, wherein the drop in pressure amounts to 0.1-10 bar.

19. The method of claim 13, comprising introducing a carrier gas comprising air, nitrogen or steam into the tank to assist with the degasification and cleaning process of dissolved or suspended solids on the underside of the tank.

20. The method of claim 19, comprising using the floating sludge drain to remove from the gas-collecting chamber foam or floating sludge arising during degasification or by the cleaning-off of suspended solids.

21. The method of claim 13, wherein the pressure in the tank is reduced as a function of the temperature of the process water such that the process liquid boils.

22. The method of claim 13, comprising re-supplying at least one part of the process water discharged from the tank to the first process stage for further treatment.

23. The method of claim 13, comprising routing the treated process water to a further process stage including at least one column suited to stripping the process water, wherein a further separation of at least gaseous compounds from the process water occurs.

24. The method of claim 23, wherein the separation in the column in a spray tower occurs by contact of the sprayed process water with a gas flow by blowing a stripping gas into the process water with fillers or components for increasing the exchange of materials surface.

25. The method of claim 23, wherein in the first process stage, the solids are discharged at least partially in the form of sludge, and the gaseous compounds and gaseous compounds remaining in the treated process water are discharged in the further process stage.

* * * * *